United States Patent [19]

Pringle

[11] 4,337,851
[45] Jul. 6, 1982

[54] BRAKE SUPPORT ASSEMBLY

[76] Inventor: William L. Pringle, 999 Lakeshore Rd., Grosse Pointe Shores, Mich. 48236

[21] Appl. No.: 152,743

[22] Filed: May 23, 1980

[51] Int. Cl.³ ............................................. F16D 51/22
[52] U.S. Cl. ............................ 188/330; 188/206 A; 188/250 C; 188/264 B; 188/341; 192/75; 192/93 R; 192/110 B; 308/72; 308/121; 308/124
[58] Field of Search ................. 188/79, 325, 327, 328, 188/329, 330, 332, 338, 339, 341, 250 C, 264 B, 206 A; 192/75, 78, 93 R, 110 B; 308/72, 121, 124

[56] References Cited

U.S. PATENT DOCUMENTS

| | | | |
|---|---|---|---|
| 1,076,563 | 10/1913 | Duffy | 188/79 |
| 1,837,681 | 12/1931 | Schwager | 188/327 |
| 1,848,428 | 3/1932 | Loweke | 188/327 |
| 2,083,688 | 6/1937 | Clements | 308/72 X |
| 2,116,174 | 5/1938 | Kay | 188/325 |
| 2,164,878 | 7/1939 | Main | 188/341 X |
| 2,739,852 | 3/1956 | Levy | 308/121 |
| 2,813,762 | 11/1957 | Bridenbaugh | 308/72 |
| 3,279,569 | 10/1966 | Kieser et al. | 188/330 X |
| 3,368,648 | 2/1968 | Brownyer | 188/250 C |
| 3,589,781 | 6/1971 | Hanley et al. | 308/72 X |
| 4,157,747 | 6/1979 | Getz et al. | 188/206 A |
| 4,203,508 | 5/1980 | Borkowski | 192/75 |

FOREIGN PATENT DOCUMENTS

| | | |
|---|---|---|
| 1208569 | 1/1966 | Fed. Rep. of Germany ... 188/264 B |
| 2752368 | 6/1978 | Fed. Rep. of Germany ........ 308/72 |
| 591357 | 4/1959 | Italy .................................... 188/341 |

*Primary Examiner*—George E. A. Halvosa
*Attorney, Agent, or Firm*—McGlynn and Milton

[57] ABSTRACT

A brake support assembly to be mounted on a vehicle axle housing for supporting a brake shoe assembly and an actuator therefor comprising a backing plate adapted to be fixedly mounted on a vehicle axle housing and two anchoring plates removably attached to the backing plate for pivotally supporting the brake assembly. Each anchoring plate includes projections which correspond to bores in the backing plate for positioning the anchoring plate at a predetermined position on the backing plate whereby the anchoring plate may be removed and replaced while maintaining a constant positioning of the brake assembly. In a first embodiment, the anchoring plate includes integral projections extending therefrom. In a second embodiment, the anchoring plate includes a tapered bore extending therethrough for supporting a pin. The pin extends from the plate defining the projection which corresponds with the bore in the backing plate. The backing plate also includes a pocket for retaining a spherical bushing which provides a low friction support for the actuator shaft whereby the bushing allows for small amounts of variation in the alignment of the actuator shaft.

25 Claims, 6 Drawing Figures

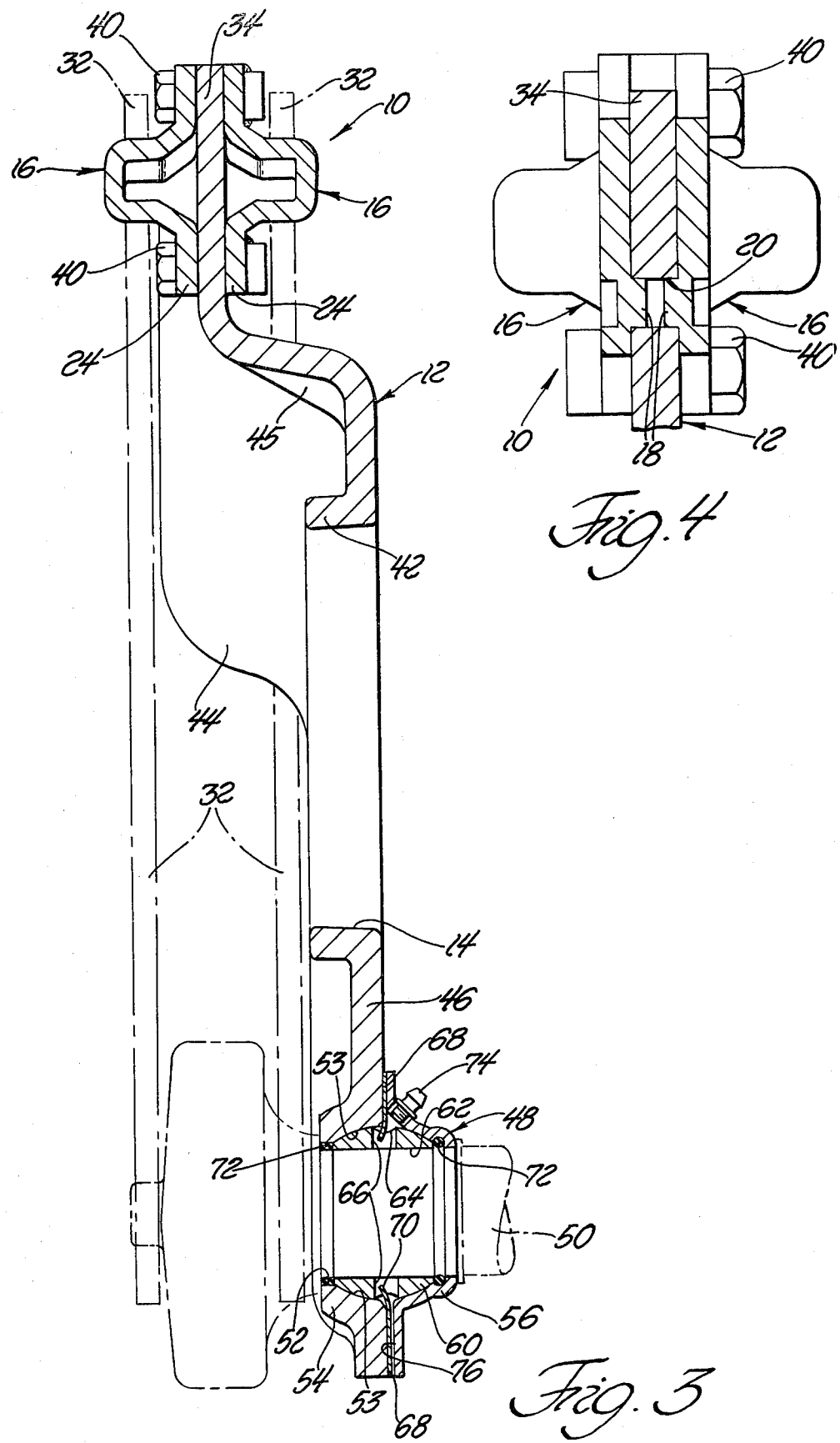

BRAKE SUPPORT ASSEMBLY

BACKGROUND OF THE INVENTION (1) Field of the Invention

The subject invention relates to brake support assemblies or spiders which are mounted on a vehicle axle for supporting a brake shoe assembly and an actuator therefor.

(2) Description of the Prior Art

Prior art brake support assemblies or spiders have been constructed so as to pivotally support a brake shoe assembly and also support a rotatable shaft. These means for supporting the brake shoes and actuator shaft need be aligned with the opening for receiving the vehicle axle. One type of prior art spider includes pins which are supported by bores in the spider. These bores must be machined to provide the proper alignment. Also, the actuator shaft is generally supported within a bore in the spider and also requires machining. This machining is expensive and time-consuming.

Further problems develop with this type of prior art spider after the assembly has been used on a motor vehicle. The pins and the actuator shaft produce wear on the supporting bores. When either of the pins are replaced due to wear, the bores require expensive machining to realign the replaced members. Also, the rotating shaft deteriorates the supporting bore. This results in more expenses and, more commonly, replacement of the entire spider assembly.

SUMMARY OF THE INVENTION

The instant invention provides a brake support assembly to be mounted on a vehicle axle for supporting a brake shoe assembly and an actuator therefor. The assembly includes a backing plate having a opening extending therethrough for receiving the axle therethrough to fixedly mount the backing plate on the axle and an anchoring plate for movably attaching to the backing plate for pivotally supporting the brake assembly. The anchoring plate includes projections which correspond to bores in the backing plate for positioning the anchoring plate at a predetermined position on the backing plate whereby the anchoring plate may be removed and replaced while maintaining a constant positioning of the brake assembly. Also, the backing plate can include a pocket for supporting a spherical bushing which provides a low friction support for the actuator shaft whereby the bushing allows for small amounts of variation in the alignment of the actuator shaft.

PRIOR ART STATEMENT

The U.S. Pat. No. 4,157,747 to Getz et al. issued June 12, 1979 is an example of a prior art brake support assembly. The Getz patent teaches an assembly including a backing plate having anchor pins secured and supported within bosses in the backing plate. The pins pivotally engage brake shoes. The Getz assembly requires expensive machining of the bosses to insure proper alignment of the pins in relation to the brake actuating mechanism. Furthermore, normal use of the brake assembly results in wear of the pins and extensive deterioration of the supporting bosses. Replacement of the pins often necessitates machining of the bosses to realign the assembly or complete replacement of the assembly.

The instant invention solves the aforementioned problems by a novel anchoring member for pivotally engaging the brake shoes which includes an alignment means which does not require the expensive machining of the prior art and it is, therefore, less expensive to manufacture and much simpler to replace.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a cross-sectional view of the first embodiment taken substantially along line 3—3 of FIG. 2;

FIG. 4 is an enlarged fragmentary cross-sectional view taken substantially along line 4—4 of FIG. 2;

DESCRIPTION OF PREFERRED EMBODIMENT

Figure 1:
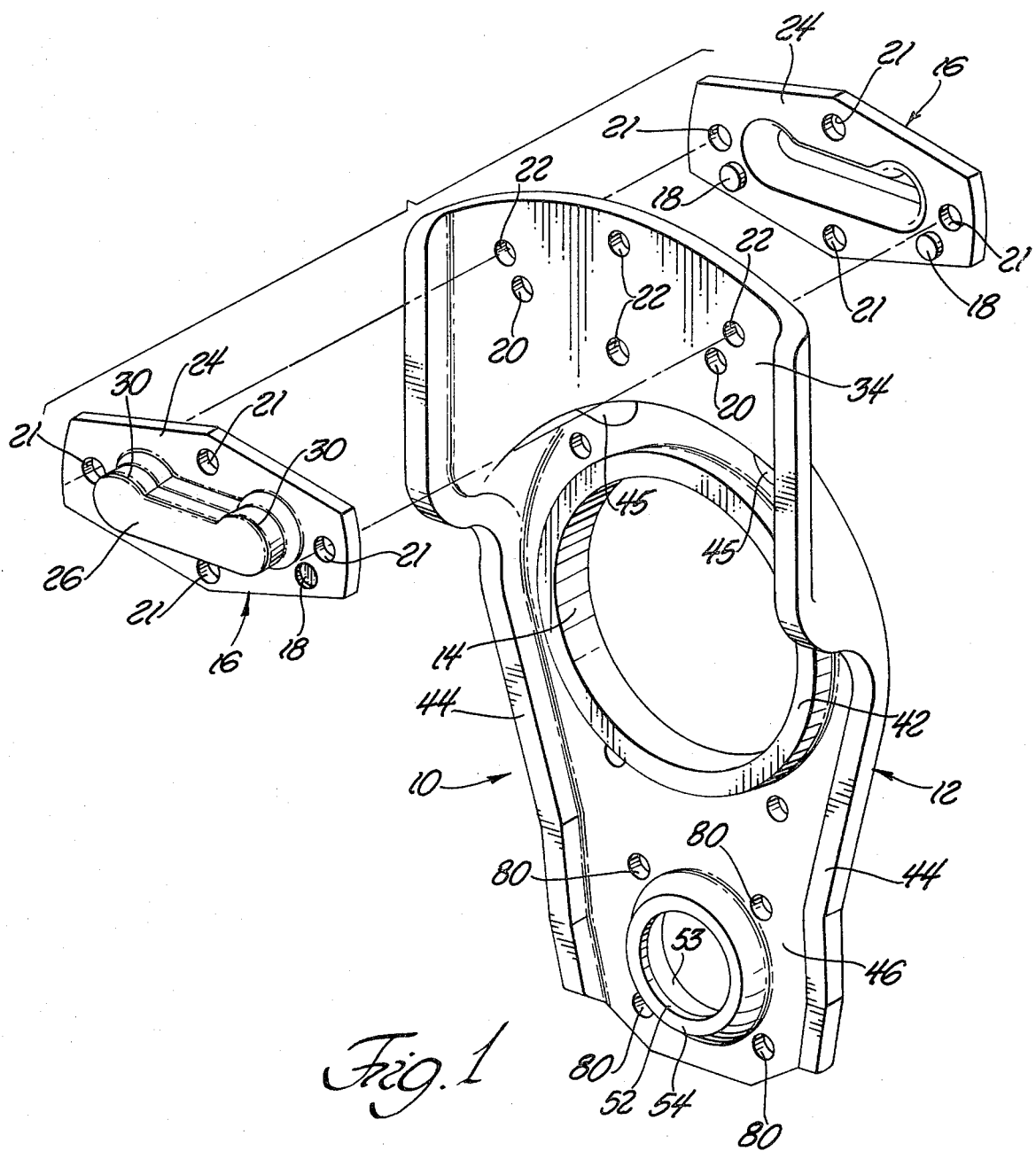
FIG. 1 is an exploded perspective view of a first embodiment of the instant invention.

A first embodiment of a brake support assembly constructed in accordance with the instant invention is generally shown at 10 in FIGS. 1 through 4. The brake support assembly 10 is of the type for supporting a brake shoe assembly which includes a pair of arcuate ribs which are disposed in parallel spaced relationship to one another as is well known and as shown in applicant's co-pending U.S. application Ser. No. 970,326 filed Dec. 18, 1978, now U.S. Pat. No. 4,421,600, issued Dec. 30, 1980.

The assembly 10 comprises a backing plate generally indicated at 12 having an opening 14 extending therethrough for receiving a vehicle axle housing therethrough to fixedly mount the backing plate 12 on the axle housing. The assembly also includes anchoring means generally indicated at 16 and removably attached to the backing plate 12 for pivotally supporting the brake assembly. The brake support assembly further includes alignment means 18 for positioning the anchoring means 16 at a predetermined position on the backing plate 12 whereby the anchoring means 16 may be removed and replaced while maintaining a constant positioning of the brake assembly. Therefore, after the assembly has been used on a vehicle axle such that the anchoring means 16 have incurred wear such that they need to be replaced, the anchoring means 16 can be removed and replaced without requiring the expensive machining necessary with prior art brake support assemblies to realign the anchoring means 16 at a predetermined position on the backing plate 12.

The backing plate 12 includes a plurality of alignment bores 20 therein, as shown in FIGS. 1 and 4. This first embodiment of the instant invention includes bores 20 which extend completely through the backing plate 12. The alignment means includes projections 18 extending from the anchoring means 16 which coact with the bores 20 to align the anchoring means 16 at the predetermined position on the backing plate 12.

Figure 2:
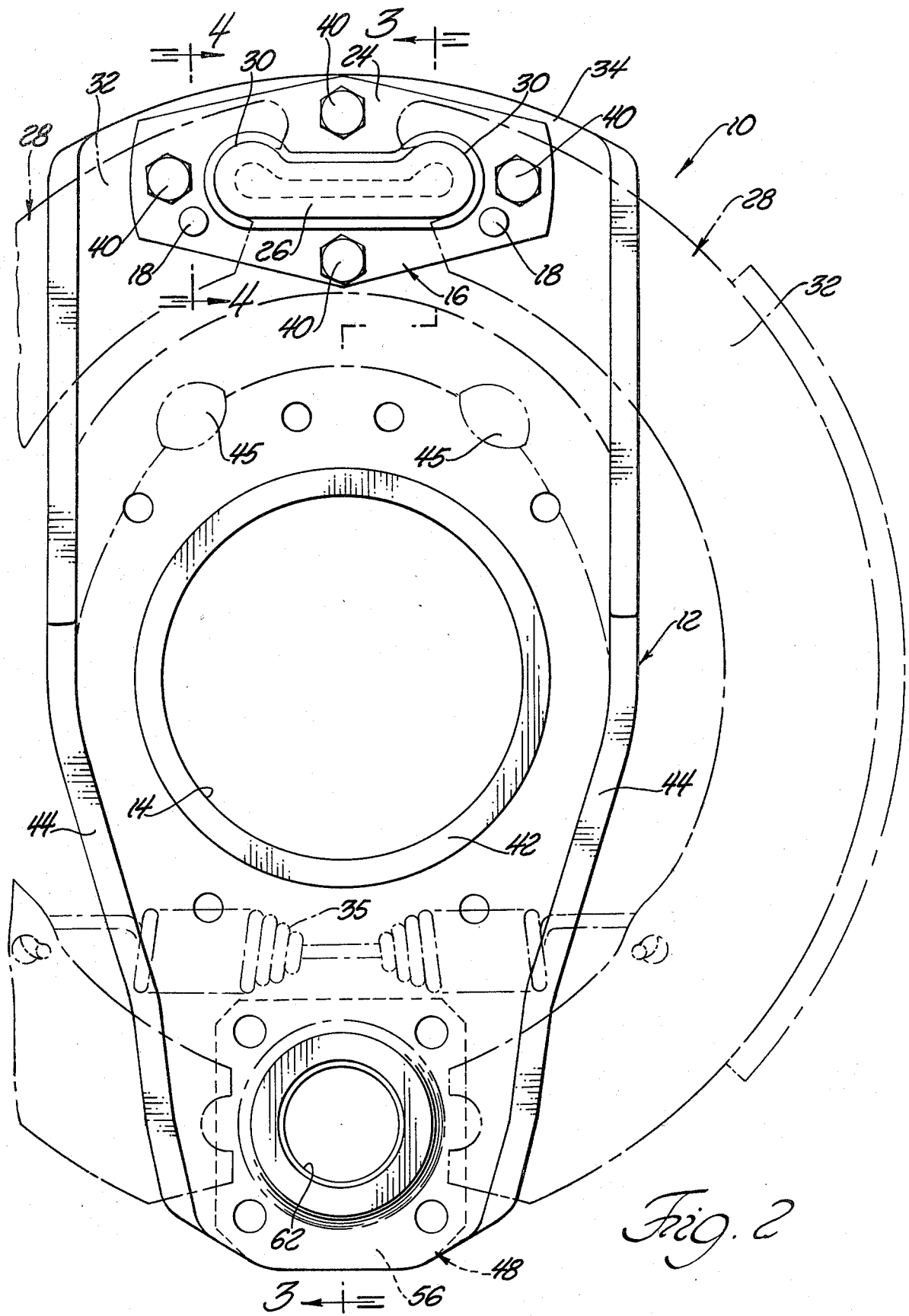
FIG. 2 is an elevational view of the first embodiment.

As shown in FIG. 1, the anchoring means 16 includes two identical and integral anchoring plates 24 each having a projecting portion 26 for pivotally engaging a brake shoe assembly. FIG. 2 shows the anchoring plate 24 pivotally supporting two brake shoes each generally indicated at 28. The projecting portion 26 of the anchoring plate 24 includes spaced rounded ends 30 for pivotally engaging the oppositely disposed brake shoes 28. Spring member 35 maintains the brake shoes 28 properly seated upon the rounded ends 30 of the projection 26.

The backing plate 12 includes a support flange 34 having opposite parallel faces. One of the anchoring plates 24 is disposed on each of the faces whereby the rounded ends 30 of the anchoring plates 24 are paired to coact with spaced ribs 32 of a brake shoe 28.

The anchoring plates 24 include openings 21 therethrough which correspond to openings 22 in the support flange 34 of the backing plate 12 for receiving removable fastening means for securing the anchoring plate 24 to the backing plate 12 and for allowing the anchoring plate 24 to be removed and replaced. As shown in FIG. 3, the fastening means comprises bolts and nuts 40. Therefore, to remove the anchoring plates 24, the bolts 40 are removed thereby releasing the anchoring plates 24. Projections 18 on the new anchoring plates 24 are aligned with bores 20 in the backing plate 12. Thus, the new anchoring plates 24 are properly aligned in a predetermined position on the backing plate 12 without any expensive machining to ensure the proper alignment.

The backing plate 12 includes an integral opening flange 42 extending completely about the opening 14. The integral opening flange 42 is seated upon the vehicle axle housing as the brake support assembly 10 is force-fitted thereon. The opening flange 42 provides an increased surface seated against the vehicle axle housing thereby increasing the stability of the contact between the backing plate 12 and the axle housing. In other words, the flange 42 provides an increased surface which is axially in contact with the axle housing so as to better accommodate the force fitting of the backing plate 12 on the axle housing. It should be noted that the backing plate 12 is of a constant thickness. The opening flange 42 provides the necessary strength to allow the backing plate to be force-fitted onto an axle housing and, furthermore, allows the backing plate 12 to be made from a thinner sheet of metal than would normally be required if the flange 42 was not included.

The backing plate 12 includes integral side flanges 44 extending therefrom and embossments 45. The side flanges 44 extend from the backing plate 12 in the same direction as the opening flange 42. The backing plate 12 also includes a lower flange 46 below the support flange 34. The support flange 34 and lower flange 46 are in spaced parallel planes, i.e., the support flange 34 is in a plane forward of the lower flange 46 in the same direction as the opening flange 42 extends. Also, the support flange 34 is wider between the side flanges 44 than the lower flange 46. The side flanges 44 and the construction of the support flange 34 and lower flange 46 further allow the backing plate 12 to be made of a thinner gauge piece of metal having a constant thickness resulting in a less costly assembly having sufficient strength.

The backing plate 12 and anchoring plates 24 are made from blanks which are pressed at successive stations and do not require the expensive machining as do the prior art brake support assemblies. Each member requires multiple stampings, the final product being ready for assembly and already being properly aligned to desired specifications.

The lower flange 46 includes support means generally indicated at 48 for supporting a rotatable shaft portion 50 of a brake actuator. The support means 48 includes an opening 52 in the lower flange 46 having a lip 54 thereabout. The lip 54 defines a cup-shaped recess 53. The support means 48 also includes a cup-shaped retaining plate 56 secured to the backing plate 12 about the cup-shaped recess 53 to define a spherical cavity with the recess 53. The support means 48 also includes a bushing 60 having a spherical-shaped outer surface and having a cylindrical passageway 62 therethrough for supporting the actuator shaft 50. The passageway 58 includes lubricant therein so that the bushing 60 provides a low friction support for the actuator shaft 50 whereby the bushing 60 allows for a small amount of variation in the alignment of the actuator shaft 50. In other words, the spherical bushing 60 is in the lubricated environment of the spherical cavity such that it is allowed to swivel within the cavity. Therefore, the bushing 60 allows for small differences in the alignment of the actuator shaft 50 as opposed to prior art assemblies in which the supporting boss would require expensive machining to ensure a single proper alignment of the actuator shaft. Also, the bushing provides an efficient low friction support for the actuator shaft 50 as opposed to prior art constructions.

The bushing 60 includes an annular groove 64 disposed about the outer surface thereof for allowing the lubrication to be evenly distributed within the support means 48. The bushing 60 also includes at least one hole 66 therethrough extending radially from the cylindrical passageway 62 and through the groove 64 for allowing access of the lubricant to the cylindrical passageway 62 and the actuator shaft 50.

The support means 48 also includes a washer member 68 fixedly disposed between the retaining plate 56 and the backing plate 12 about the cup-shaped recess 53. The washer member 68 includes at least one finger 70 extending radially inwardly into one of the holes 66 in the bushing 60 so as to prevent rotation of the bushing 60. The bushing 60 includes two holes 66 and the washer 68 includes two fingers 70 extending into the holes 66 for preventing the rotation of the bushing. The bushing 60 is retained between two O-rings 72 which provide a seal about the passageway 58.

In operation, the bushing 60 provides a lubricated surface in contact with the actuator shaft 50. The actuator shaft 50 rotates within the cylindrical passageway 62 of the bushing 60. The fingers 70 prevent the bushing 60 from rotating with the actuator shaft 50, however, the fingers 70 allow for small movements of the bushing 60 with the actuator shaft 50 thereby decreasing wear on the bushing 60 which would be the result of slightly misaligned movements of the rotating shaft 50. In other words, the bushing 50, unlike prior art supporting means, allows for slight variations in the alignment and rotation of the actuator shaft 50 and yet maintains the actuator shaft in proper position relative to the brake assembly.

The retaining plate 56 includes a fitting 74 for allowing the injection of lubricant into the support means 48. The support means 48 also includes an accessway 76 spaced from the fitting 74 for allowing egress of lubricant whereby fresh lubricant injected into the support means 48 forces used lubricant out through the accessway 76. The accessway 76 is formed by a groove in the retaining plate 56 and is quite small in diameter (shown as 0.001 inch) so as to prevent unwanted loss of lubricant from the support means 48.

Figure 5:
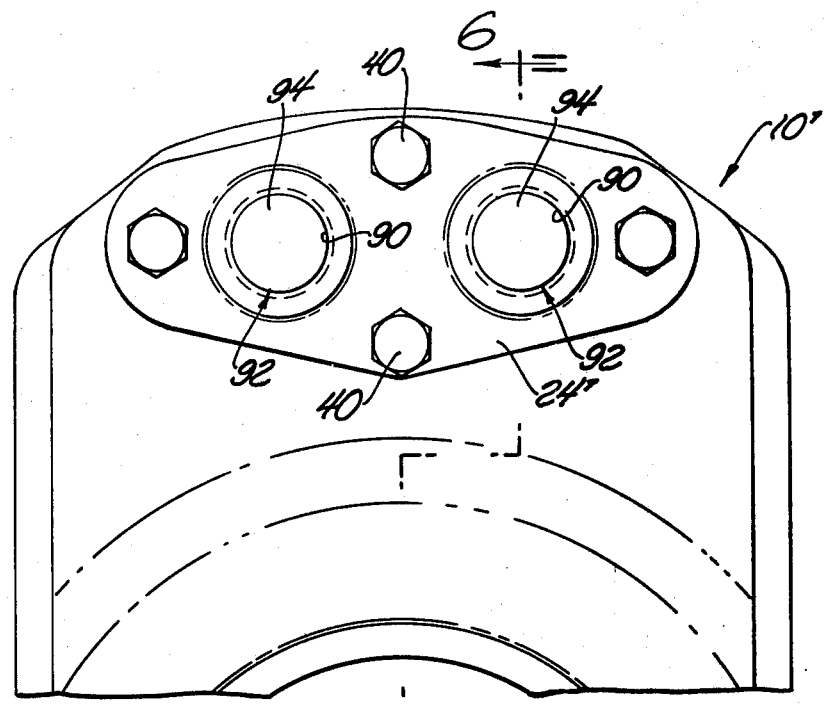
FIG. 5 is an enlarged fragmentary elevational view of a second embodiment of the instant invention.
Figure 6:
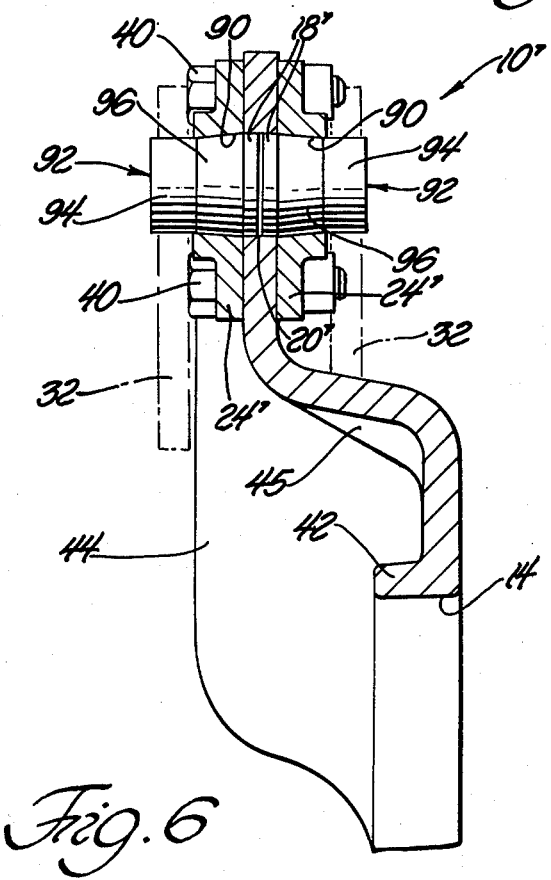
FIG. 6 is a fragmentary cross-sectional view taken substantially along line 6—6 of FIG. 5.

A second embodiment of the instant invention is generally shown at 10' in FIGS. 5 and 6 and differs from the first embodiment in the anchoring means which includes a pair of anchoring plates 24'. Each anchoring plate 24' includes two anchoring bores 90. The anchoring means 16 also includes a pin generally indicated at 92 fixedly secured in each of the bores 90. The projecting means in this embodiment includes a first end portion 94 of the pin 92 extending outwardly from the bore 90 in the anchoring plate 24'. The first end portion 94 is cylindrical so as to define the rounded anchor for pivotally engaging the ribs 32 of the brake shoes 28.

As in the first embodiment, fastening means 40 fixedly secure the anchoring plates 24' to the backing plate 12.

The bores 90 extend completely through the anchoring plate 24'. The bores 90 are frustoconical and taper outwardly from the backing plate 12. Each pin 92 includes an intermediate portion 96 fixedly disposed within the bore 90. The intermediate portion is inwardly tapered or frustoconical towards the first end portion 94.

The anchoring plate 24' includes an outwardly extending flange defining the conical bore 90. The pins 92 are press-fitted into the bores 90.

The alignment means of the second embodiment includes a second end portion of the pins 92 extending inwardly from the anchoring plates 24' defining the projections 18'. The projections 18' coact with bores 20' extending through the backing plate to align the anchoring means on the backing plate.

The anchoring means are assembled by press fitting the pins 92 into the conical bores 90 of the anchoring plate 24' so that the tapered intermediate portion 96 of the pin 92 is fixedly engaged within the bore 90. The anchoring means are then fastened to the backing plate 12' by aligning the projections 18' with the bores 20' in the backing plate and tightening the bolts 40.

In use, the stresses exerted by the pivotting brake shoe assembly 28 are transferred from the pins 92 to the fastening means 40. Thusly, the bore 20 in the backing plate 12 is spared from excessive wear during use of the assembly and still provides an accurate alignment means 18'. Therefore, the anchoring means 16 may be removed and replaced while maintaining a constant positioning of the brake assembly 28. In other words, during use, the brake shoe assembly exerts forces on the first end portion 94 of the pin 92. These forces are absorbed by the fastening means 40 coacting with the backing plate 12 rather than the second end portion 18' of the pin coacting with the bore 20'. Therefore, after prolonged use, the anchoring plate 24' can be replaced and the bore 20' will still provide an accurate alignment means without requiring additional machining.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or pivilege is claimed are defined as follows:

1. A brake support assembly (10) to be mounted on a vehicle for supporting a brake shoe assembly (28) and an actuator therefor, said assembly (10) comprising; a backing plate (12) having an opening (14) extending therethrough for receiving an axle therethrough to fixedly mount said backing plate (12) on the axle and having a plurality of alignment bores (20, 20') therein and having a support flange (34) having opposite parallel faces and having integral side flanges 44 extending therefrom, anchoring means (16) removably attached to said backing plate (12) for pivotally supporting the brake shoe assembly (28) and comprising an anchoring plate (24,24') having projecting means (26,92) for pivotally engaging the brake shoe assembly (28) and said projecting means (26,96) including spaced rounded anchors (30,94) for pivotally engaging oppositely disposed brake shoes (32) of the brake shoe assembly (28) and one of said anchoring plates (24,24') being disposed on each of said parallel faces of said support flange (34) whereby said rounded anchors (30,94) are paired to coact with spaced ribs (36,38) of a brake shoe (32), removable fastening means (40) removable from said anchoring means (16) and said backing plate (12) independently of said alignment means for securing said anchoring means (16) to said backing plate (12) and for allowing said anchoring means (16) to be removed and replaced, and alignment means (18,18') structurally different from said fastening means (40) for positioning said anchoring means (16) at a predetermined position on said backing plate (12) whereby said anchoring means (16) may be removed and replaced while maintaining a constant positioning of the brake shoe assembly (28) and said alignment means (18,18') including projections (18,18') extending from said anchoring means (16) for coacting with said alignment bores (20,20') to align said anchoring means (16) at said predetermined position on said backing plate (12).

2. An assembly as set forth in claim 1 wherein said projecting means (26) are integral projections extending from said anchoring plate (24).

3. An assembly as set forth in claim 2 wherein said alignment bores (20) in said backing plate (12) are holes extending completely through said support flange 34.

4. An assembly as set forth in claim 1 wherein said anchoring means (16) includes two anchoring bores (90) in said anchoring plate (24'), said anchoring means also including a pin (92) fixedly secured in each of said anchoring bores (90), said projecting means including a first end portion (94) of said pins (92) extending outwardly from said anchoring bore (90) in said anchoring plate (24'), said first end portion (94) being cylindrical so as to define said rounded anchor.

5. An assembly as set forth in claim 4 wherein said anchoring bores (90) extend completely through said anchoring plate (24'), said anchoring bores (90) being outwardly conically tapered, said pins (92) including an intermediate portion (96) fixedly disposed within said anchoring bore (90), said intermediate portion being inwardly conically tapered towards said first end portion (94).

6. An assembly as set forth in claim 5 wherein said anchoring plate (24') includes an outwardly extending flange defining said outwardly tapered anchoring bores (90).

7. An assembly as set forth in claim 6 wherein said alignment means includes a second end portion (18') of said pin (92) extending inwardly from said anchoring plate (24') defining said projection (18'), said projections (18') coacting with said alignment bores (20') of said backing plate (12') to align said anchoring means (16).

8. An assembly as set forth in claim 7 wherein said backing plate (12) includes an integral opening flange (42) extending completely about said opening (14).

9. An assembly as set forth in claim 8 wherein said backing plate (12) is of a constant thickness.

10. An assembly as set forth in claim 8 wherein said side flanges (44) extend from said backing plate (12) in the same direction as said opening flange (42).

11. An assembly as set forth in claim 10 wherein said backing plate (12) includes a lower flange (46) below said support flange (34), said support (34) and lower (46) flanges being in spaced parallel planes.

12. An assembly as set forth in claim 11 wherein said support flange (34) is wider between said side flanges (44) than said lower flange (46).

13. An assembly as set forth in claim 12 wherein said lower flange (46) includes support means (48) for supporting a rotatable shaft portion (50) of the brake actuator.

14. An assembly as set forth in claim 13 wherein said support means (48) includes an opening (52) in said lower flange (46) having a lip (54) thereabout defining a cup-shaped recess (53), said support means including a cup-shaped retaining plate (56) secured to said backing plate (12) about said cup-shaped recess (53) defining a spherical cavity, said support means including a bushing (60) disposed in said cavity having a spherically shaped outer surface and having a cylindrical passageway (62) therethrough for supporting the actuator shaft (50), said cavity adapted for having lubricant therein so that said bushing (60) provides a low friction support for the actuator shaft (50) whereby the bushing (60) allows for small amounts of variation in the alignment of the actuator shaft (50).

15. An assembly as set forth in claim 14 wherein said bushing (60) includes an annular groove (64) disposed about said outer surface thereof for allowing the lubricant to be evenly distributed within said support means (48).

16. An assembly as set forth in claim 15 wherein said bushing (60) includes at least one hole (66) therethrough extending radially from said cylindrical passageway (62) through said groove (64) for allowing access of the lubricant to said cylindrical passageway (62) and the actuator shaft (50).

17. An assembly as set forth in claim 16 wherein said support means (48) includes a washer member (68) fixedly disposed between said retaining plate (56) and said backing plate (12) about said cup-shaped recess (53), said washer member (68) including at least one finger (70) extending radially into said spherical cavity for engaging said hole (66) in said bushing (60) so as to prevent rotation of said bushing (60).

18. An assembly as set forth in claim 17 wherein said retaining plate (56) includes a fitting (74) for allowing the injection of lubricant into said support means (48).

19. An assembly as set forth in claim 18 wherein said support means (48) includes an accessway (76) spaced from said fitting (74) for allowing egress of the lubricant whereby the lubricant injected into said support means (48) forces the used lubricant out through said accessway (76).

20. An assembly as set forth in claim 1 wherein said backing plate (12) includes support means (48) for supporting a rotatable shaft portion (50) of the brake actuator, said support means (48) including an opening (52) in said backing plate (12) spaced from said anchoring means (16) having a lip (54) thereabout defining a cup-shaped recess (53), said support means (48) including a cup-shaped retaining plate (56) secured to said backing plate (12) about said cup-shaped recess (53) defining a spherical cavity, said support means (48) including a bushing (60) disposed in said cavity having a spherically shaped outer surface and having a cylindrical passageway (62) therethrough for slidably engaging the actuator shaft (50), said cavity adapted for having lubricant therein so that said bushing (60) provides a low friction support for the actuator shaft (50) whereby the bushing (60) allows for small amounts of variation in the alignment of the actuator shaft (50).

21. An assembly as set forth in claim 20 wherein said bushing (60) includes an annular groove (64) disposed about said outer surface thereof for allowing the lubricant to be evenly distributed within said support means (48).

22. An assembly as set forth in claim 21 wherein said bushing (60) includes at least one hole (66) therethrough extending radially from said cylindrical passageway (62) and through said groove (64) for allowing access of the lubricant to said cylindrical passageway (62) and the actuator shaft (50).

23. An assembly as set forth in claim 22 wherein said support means (48) includes a washer member (68) fixedly disposed between said retaining plate (56) and said cup-shaped recess (53), said washer member (68) including at least one finger (70) extending radially into said hole (66) in said bushing (60) so as to prevent rotation of said bushing (60).

24. An assembly as set forth in claim 23 wherein said retaining plate (56) includes a removable fitting (74) for allowing the injection of the lubricant into said support means (48).

25. An assembly as set forth in claim 24 wherein said support means (48) includes an accessway (76) spaced from fitting (74) for allowing egress of the lubricant whereby the lubricant injected into said support means (48) forces the used lubricant out through said accessway (76).

* * * * *